United States Patent [19]
Hartmann

[11] Patent Number: 5,748,693
[45] Date of Patent: May 5, 1998

[54] SAFETY FEED FOR BORATING SYSTEM FOR A PRESSURIZED WATER REACTOR AND PROCESS FOR OPERATING SUCH A SYSTEM

[75] Inventor: Heinz-Werner Hartmann, Buckenhof, Germany

[73] Assignee: Siemens Aktiengesellschaft, Munich, Germany

[21] Appl. No.: 671,797

[22] Filed: Jun. 24, 1996

Related U.S. Application Data

[63] Continuation of PCT/DE94/01474, Dec. 12, 1994.

[30] Foreign Application Priority Data

Dec. 23, 1993 [DE] Germany .............. 43 44 323.0

[51] Int. Cl.⁶ .................................. G21C 9/00
[52] U.S. Cl. .................. 376/282; 376/298; 376/299
[58] Field of Search ..................... 376/282, 298, 376/299; 976/DIG. 196

[56] References Cited

U.S. PATENT DOCUMENTS

| | | | |
|---|---|---|---|
| 4,046,626 | 9/1977 | Winkler et al. | 376/282 |
| 4,064,002 | 12/1977 | Desmarchais et al. | 376/282 |
| 4,072,560 | 2/1978 | Seidelberger | 376/282 |
| 4,473,528 | 9/1984 | Kleimola | 376/282 |
| 4,702,879 | 10/1987 | Tower et al. | 376/282 |
| 4,784,824 | 11/1988 | Gandrille et al. | 376/282 |

FOREIGN PATENT DOCUMENTS

| | | |
|---|---|---|
| 0 063 994 | 11/1982 | European Pat. Off. |
| 0 405 720 | 1/1991 | European Pat. Off. |
| 2 255 889 | 7/1973 | Germany. |
| 22 07 870 | 8/1973 | Germany. |
| 24 46 090 C3 | 4/1976 | Germany. |
| 24 48 591 | 4/1976 | Germany. |
| 25 21 269 | 11/1976 | Germany. |
| 32 10 745 C2 | 11/1982 | Germany. |
| 90 09025 | 1/1990 | WIPO. |

OTHER PUBLICATIONS

Abstract of European Patent Application No. 86 046653 (Derwent), dated Dec. 20, 1985.

Patent Abstract of Japan No. 2 287196 (Kawata), dated Nov. 27, 1990.

Patent Abstract of Japan No. 2 2272394 (Sasagawa), dated Nov. 7, 1990.

Primary Examiner—Michael J. Carone
Assistant Examiner—Matthew J. Lattig
Attorney, Agent, or Firm—Herbert L. Lerner; Laurence A. Greenberg

[57] ABSTRACT

In the event of an incident in a pressurized water reactor with a safety feed and borating system, it is necessary that sufficient primary cooling water be available in the reactor cooling system or be resupplied, and it must also be possible to render the reactor subcritical with added boron and to maintain it in that state. The invention is a safety feed and borating system for a pressurized water reactor with series-connected safety feed and additional borating pumps. The additional borating pump is connected downstream of the safety feed pump and it has a parallel-connected bypass line with a check valve. Both pumps have a common minimum quantity line with different and reversible throttle restrictions. Thus the feed level and throughput of the entire system can be adapted optimally to existing demands. It is no longer necessary to provide a separate high-pressure borating system. The method of operating the safety feed and borating system allows control over four different abnormal operating states of the pressurized water reactor.

7 Claims, 3 Drawing Sheets

SAFETY FEED FOR BORATING SYSTEM FOR A PRESSURIZED WATER REACTOR AND PROCESS FOR OPERATING SUCH A SYSTEM

CROSS-REFERENCE TO RELATED APPLICATION

This application is a continuation of international application PCT/DE94/01474, filed Dec. 12, 1994.

BACKGROUND OF THE INVENTION

1. Field of the Invention

The invention relates to a safety feed and borating system for a pressurized water reactor and to a process for operating the system.

In the event of an incident, because of the requisite heat dissipation, a sufficient amount of primary coolant must be present in the primary loop, or it must be possible to resupply it to that loop. Moreover, for reasons of nuclear physics, the reactor must be capable of being rendered subcritical with added boron and maintained in that state.

2. Description of the Related Art

While this object is intrinsically the same with respect to the feeding of cooling water, there have been used in the prior art, in accordance with German Patent DE C3 22 07 870, two separate systems. One of the systems is a safety feed system for supplementing the primary cooling water in the event of a coolant loss incident or if steam generator heating tubes should leak, and the other system is an additional borating system for turning off the reactor (for example in response to action from outside or to a failure of control rods) and for the normal shutdown of the reactor. Compared with a single system, the two systems together require approximately twice as much expenditure for pipelines, fixtures, control and measurement technology, and twice as many penetrations through the containment.

International Publication Wo 90/09025 describes an auxiliary loop that is connectable to the primary loop of a nuclear power plant. The auxiliary loop serves the purpose of quantity control and influences the chemical composition of the primary coolant, and especially the boron content. To that end, the auxiliary loop has means for withdrawing primary coolant and resupplying primary coolant to the primary cooling loop. A large steam-water reservoir, which performs various functions, is located in the auxiliary loop. Borated water is held is reserve in a lower region of the reservoir; for the sake of safety feeding, it can be fed directly into the primary cooling loop downstream of the primary coolant pump via a separate, adequately sized line. The primary coolant held in reserve in the reservoir for quantity control is supplied via a return pump through a return line directly to the primary coolant pump. Safety feeding takes place in uncontrolled fashion, because of the pressure prevailing in the reservoir; conversely, quantity control and chemical variation of the primary coolant are done entirely separately from the safety feeding, either before or after the reservoir. The safety feeding and the control of the quantity and composition of the primary coolant are thus—except for the aspect of common use of a reservoir—entirely separated from one another from a process standpoint.

European Patent Application 0 405 720 A2 describes a passive safety feed system that is based on differences in density in the water; in it, the desired boron concentration is meant to be maintained by natural circulation.

Another emergency and residual-heat system based on the principle of the development of natural circulation has been disclosed in DE 25 21 269 A1. The safety feed system described therein has an emergency and residual-heat coolant loop for a pressurized water reactor. A residual-heat cooler with a boric acid container connected parallel to it is disposed in the loop, and a parallel circuit comprising a pump and a line that is closable with a flap precedes this cooler. Water is pumped via the pump through the residual-heat cooler if the primary cooling loop is intact. In an emergency situation, the flap opens, and natural circulation through the residual-heat cooler develops. To lower the reactivity of the primary coolant, the pump can be made to precede the boric acid container by opening corresponding valves, thus enabling the feeding of boric acid into the primary cooling loop. The boric acid container and the residual-heat cooler are followed by a single common throttle with an adjustable opening cross section. Natural circulation systems of this kind are complicated and can hardly be adapted to the various kinds of damage that can occur.

SUMMARY OF THE INVENTION

It is accordingly an object of the invention to provide a safety feed and borating system for a pressurized water reactor and process for operating such a system, which overcomes the above-mentioned disadvantages of the heretofore-known devices and methods of this general type and which, while preserving the usual redundance in reactor construction, is a safety feed and borating system in which reduced expense yet with additional safety is achieved, and wherein the feed quantity of cooling water can be adapted to the progress of the incident.

With the foregoing and other objects in view there is provided, in accordance with the invention, a safety feed and borating system for a pressurized water reactor, comprising:

a safety feed pump;

a parallel circuit connected in series with said safety feed pump, said parallel circuit being formed with a borating pump and a bypass line with a shutoff device connected in parallel with said borating pump;

a feed bank connected downstream of said safety feed pump and said parallel circuit; and a minimum quantity feed system communicating with said feed bank, said minimum quantity feed system including at least two minimum quantity branch lines selectively connectable to said feed bank, a first one of said branch lines having a first throttle restriction for a large minimum quantity and a second one of said branch lines having a second throttle restriction for a small minimum quantity.

In accordance with an added feature of the invention, said minimum quantity feed system includes a minimum quantity line connected in series between said feed bank, and said at least two minimum quantity branch lines.

In other words, the safety feed and borating system for a pressurized water reactor has a safety feed pump and an additional borating pump, in which a bypass line with a check valve is connected parallel to the additional borating pump, and this parallel circuit comprising the additional borating pump and the check valve is connected in series with the safety feed pump. Via the safety feed pump, which enables high-pressure feeding, feeding can be done directly into the reactor cooling system, and in particular into the primary system of the reactor pressure vessel. Because it is possible to connect the additional borating pump and the safety feed pump in series, the feed quantity and boron content of the fed cooling water can be adjusted in order to control many abnormal operating states. In particular, the feed level of the pumps can be purposefully adjusted.

In accordance with an additional feature of the invention, said parallel circuit is connected downstream of said safety feed pump, as seen in a flow direction through the pumps. Depending on operational demands and given conditions, the safety feed pump can be connected downstream as well.

A feed bank is connected downstream of the pumps, from which bank a minimum quantity line for regulating and adjusting the feed level of the pumps branches off. The minimum quantity line can for this purpose be connected in series with one of at least two minimum quantity branch lines. One of the branch lines has a first throttle restriction for a large minimum quantity, or in other words to attain the lowest possible feed level, and the other branch line has a second throttle restriction for a small minimum quantity, to establish high feed levels of the pumps.

The shutoff device is preferably a check valve, and the borating pump is preferably a centrifugal pump. Compared to the piston pumps previously used as additional borating pumps, centrifugal pumps are easier to influence by means of a minimum quantity line. In particular, no pressure-limiting overflow device is required.

The advantages attainable with the invention are considered to be above all that the feed level and throughput of the common system can be adapted optimally to given demands, and a separate high-pressure borating system with the additional expense it entails can be dispensed with.

Advantageously, the safety feed and borating system in a pressurized water reactor serves to control abnormal operating states, such as a) loss of coolant, especially from the primary system of the pressurized water reactor, and loss of coolant resulting from a leak in a heating tube in a steam generator;

b) small leak in primary system with inadequate secondary-side heat dissipation;

c) maintenance of fill level in reactor pressure vessel at zero load hot and unavailable volume control system but intact primary system;

d) borating of the primary system.

The term "zero load hot" is understood here to be the status of the pressurized water reactor defined such that no thermal power is output to the turbines, after-decay heat occurs, and the primary system is still at high pressure and high temperature. In normal operation and in the event of slight disruptions in operation, the volume control system has the task of regulating the water level in the pressure vessel; this level can vary from temperature changes, from extraction of water for coolant cleaning, and from possible leaks. It may also be embodied such that it performs no safety functions and instead these safety functions are taken over by the borating system.

With the above and other objects in view there is also provided, in accordance with the invention, a process for operating a safety feed and borating system and with a reactor cooling system including a primary system and a secondary system for controlling the above-listed abnormal operating situations. In situation (a), the branch line with the throttle restriction for large minimum quantities is opened, and the safety feed pump is put into operation. As a result, coolant is resupplied via the safety feed pump directly into the primary system with a reduced feed level. In situation (b), the branch line having the throttle restriction for a small minimum quantity is opened, and once again only the safety feed pump is put into operation. In situation (c), the branch line having the throttle restriction for a minimum quantity is opened, and both pumps are put into operation, as a result of which a high feed level, for instance corresponding to a pressure of 130 bar, is attained. In situation (d), the minimum quantity line is blocked and both the safety feed pump and the additional borating pump are put into operation. As a result, the maximum possible feed level is attained, and feeding of coolant takes place either directly into a cold primary coolant line of the primary system or into the pressure vessel, which is connected to a hot primary coolant line of the primary system.

The process is defined as a method of operating a safety feed and borating system in a pressurized water reactor having a reactor cooling system with a primary system and a secondary system, the method which comprises:

providing a safety feed pump and connecting a parallel circuit in series with the safety feed pump, the parallel circuit comprising a borating pump and a bypass line with a cutoff device connected in parallel with the borating pump, connecting a feed bank downstream of safety feed pump and the parallel circuit, and branching a minimum quantity branch from the feed bank into a reactor containment, the minimum quantity branch including a minimum quantity branch line with a first throttle restriction for a large minimum quantity and a minimum quantity line with a second throttle restriction for a small minimum quantity;

and selectively performing the following steps in response to the following abnormal operating situations:

a) if a leak in a heating tube of a steam generator and loss of coolant is determined, opening the minimum quantity branch line with the first throttle restriction and operating the safety feed pump;

b) if a small leak in a primary system with inadequate secondary-side heat dissipation is determined, opening the branch line with the second throttle restriction and operating the safety feed pump;

c) if a fill level is maintained in the reactor pressure vessel at zero load hot and a volume control system is unavailable but the primary system is intact, opening the branch line and operating the safety feed pump and the borating pump; and d) if the primary system requires borating, blocking the minimum quantity branch and operating both the safety feed pump and the borating pump.

By means of this novel process, the functions of a safety feed system and of a borating system—taking as the point of departure the common object of feeding borated water—are combined in such a way that they can be performed with one feed bank per redundant safety feed and borating system.

To that end, the safety feed pump and the additional borating pump are connected in series, but in such a way that the safety feed pump can bypass the additional borating pump by means of a bypass. The feed level of the safety feed system is accordingly adapted to the currently prevailing progress of an incident, whatever it may be, by means of purposeful turning on of the additional borating pump and/or opening of a minimum quantity line with various throttle restrictions.

Other features which are considered as characteristic for the invention are set forth in the appended claims.

Although the invention is illustrated and described herein as embodied in a safety feed and borating system for a pressurized water reactor and process for operating such a system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
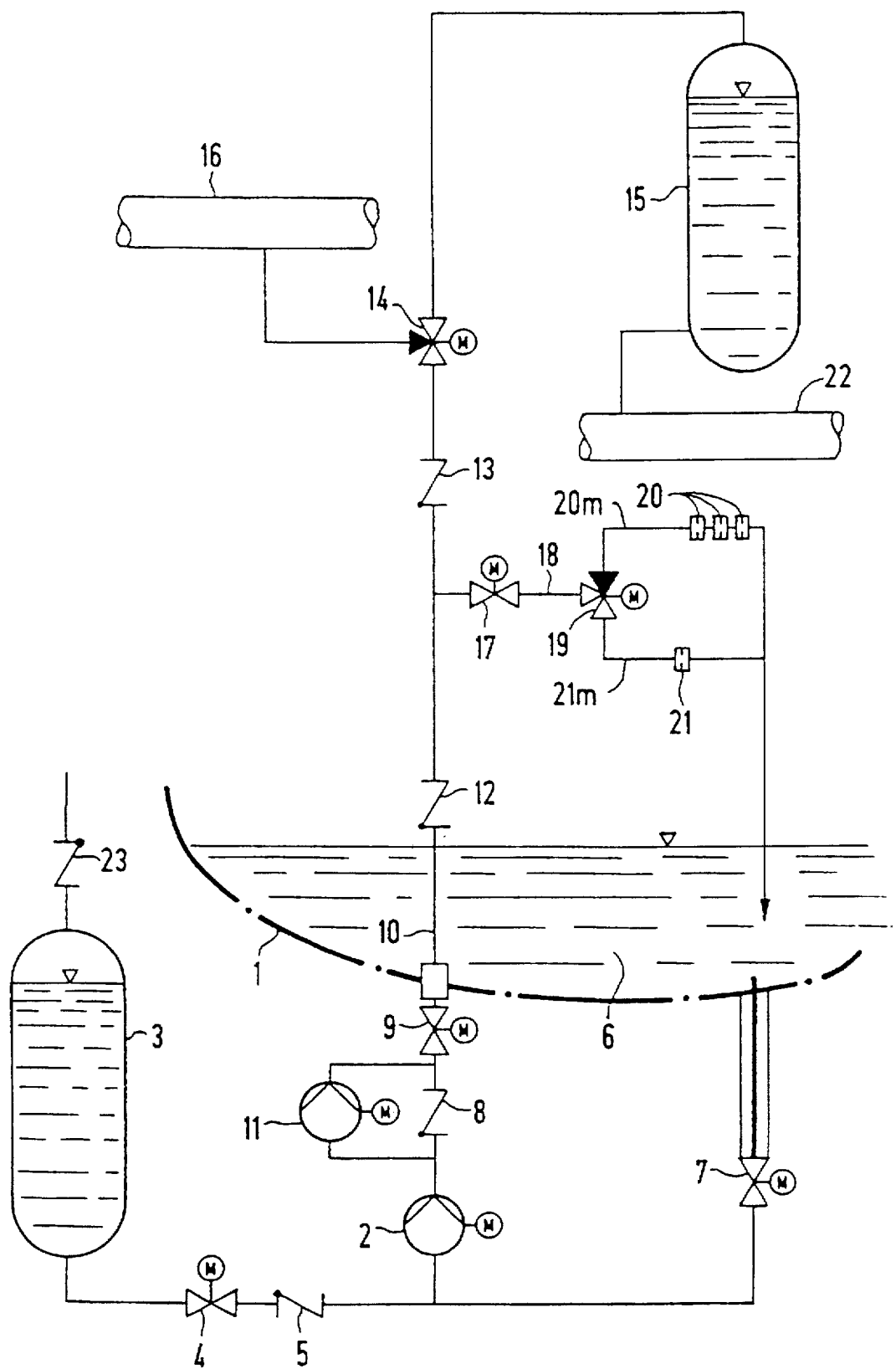
FIG. 1 is a schematic view showing the system circuit.

Referring now to the figures of the drawing in detail, and first to the diagrams of FIGS. 2–5 thereof, the fine dashed line KS is the characteristic curve of the system; the fine solid line T2.11; T11; T2 is the theoretical characteristic curve of the pump or pumps 2 and 11, respectively, and the heavy solid line R2; R2.11 is the actual characteristic curve of the pump 2 or 11 which results from subtracting the applicable minimum quantity from the theoretical characteristic curve and/or from adding two characteristic curves. The feed rate E is plotted in kg/s on the horizontal axis and the feed level F or counter-pressure in meters (m) is given on the vertical axis.

Referring now to FIG. 1, the containment 1 of a pressurized water reactor is suggested by a heavy dot-dashed line. A safety feed pump 2 is disposed outside the containment 1. The pump 2 can aspirate either from a borating container 3, specifically through a motor valve 4 and a check valve 5, or from the sump 6 of the containment 1 via a motor valve 7. In both cases, the pump forces via a check valve 8 and a further motor valve 9 into a feed bank 10 that leads into the containment 1. An additional borating pump 11 is connected in parallel to the check valve 8; the borating pump 11 is in particular a centrifugal pump, which is turned on as needed for raising the pressure in the feed bank 10. The feed bank 10 leads—via two check valves 12 and 13—to a two-way valve 14 and from there either to a pressure reservoir 15 or to a cold primary coolant line 16 of the primary system.

A minimum quantity line 18 branches off between the two check valves 12 and 13, via a motor valve 17; via a two-way valve 19, it is relieved either via a first minimum quantity branch line 20 m having a throttle restriction 20 for a small minimum quantity or via a second minimum quantity branch line 21 m having a throttle restriction 21 for a large minimum quantity, into the sump 6. Depending on the choice of the course, that is, via the throttle restriction 21 or 20, the pressure in the feed bank 10 can be lowered or raised. The highest possible pressure is achieved if the motor valve 17 is closed.

The pressure reservoir 15 communicates with a hot primary coolant line 22 of the primary system. The borating container 3 has a ventilation valve 23 on its top, which opens if negative pressure occurs as a result of a withdrawal. In this example, only one feed bank 10 is shown. Depending on the redundance required, two or more such banks 10 are in fact present, but they need not all be equipped with an additional borating pump 11.

Figure 2:
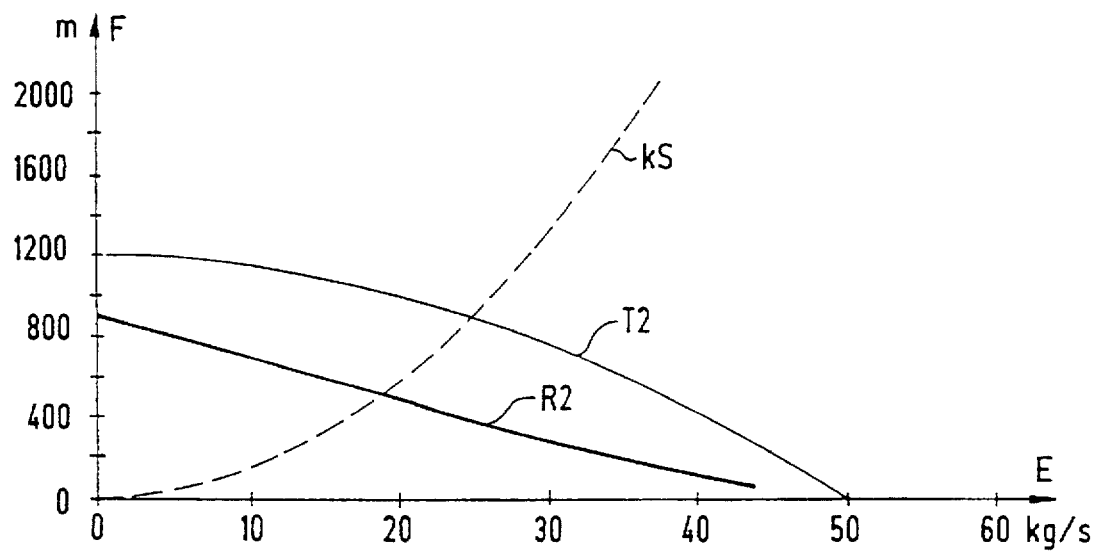
FIGS. 2–5 are plot diagrams of various characteristic curves for the system and/or the pumps.

FIG. 2 shows the characteristic curves KS, TS, R2 for the case of leakage from a steam generator heating tube and coolant loss incidents; that is, the branch line 20 m having the throttle restriction 20 for the small minimum quantity is blocked, while the branch line 21 m having the throttle restriction 21 for the large minimum quantity is open, the safety feed pump 2 is in operation, and the additional borating pump 11 is not in operation (operating situation a). Coolant from the sump 6 is fed via the feed bank 10 into the hot primary coolant line 16.

Figure 3:
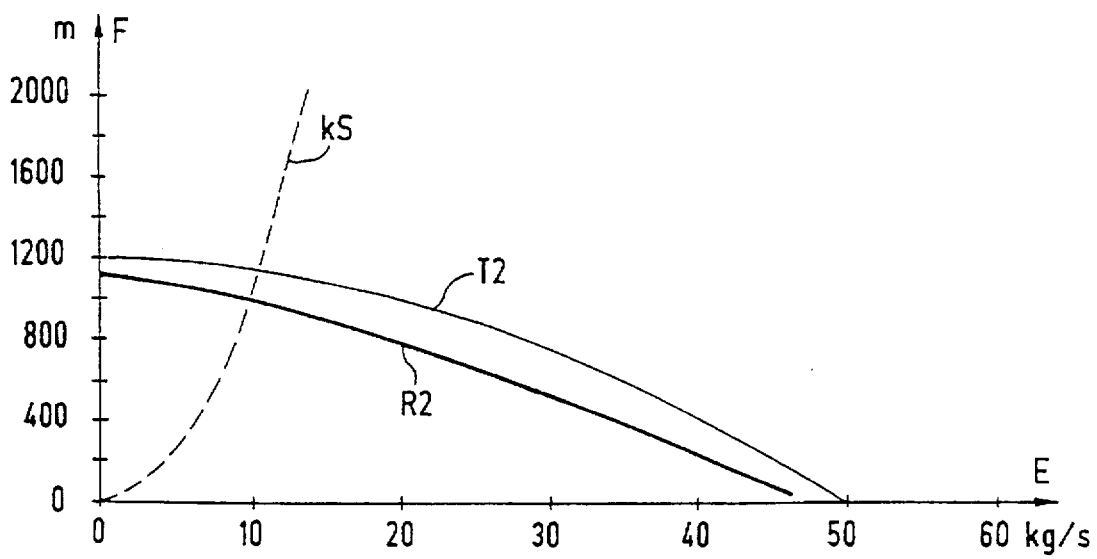

FIG. 3 shows the characteristic curves KS, T2, R2 for the situation where there are small leaks in the primary cooling system of the pressurized water reactor and impeded heat dissipation in the secondary cooling system of the pressurized water reactor; that is, the throttle restriction 20 for no minimum quantity in the branch line 20 m is open, the safety feed pump 2 is in operation, and the additional borating pump 11 is not in operation (operating situation b). Feeding of coolant from the sump 6 thus takes place at elevated pressure into the primary cooling system.

Figure 4:
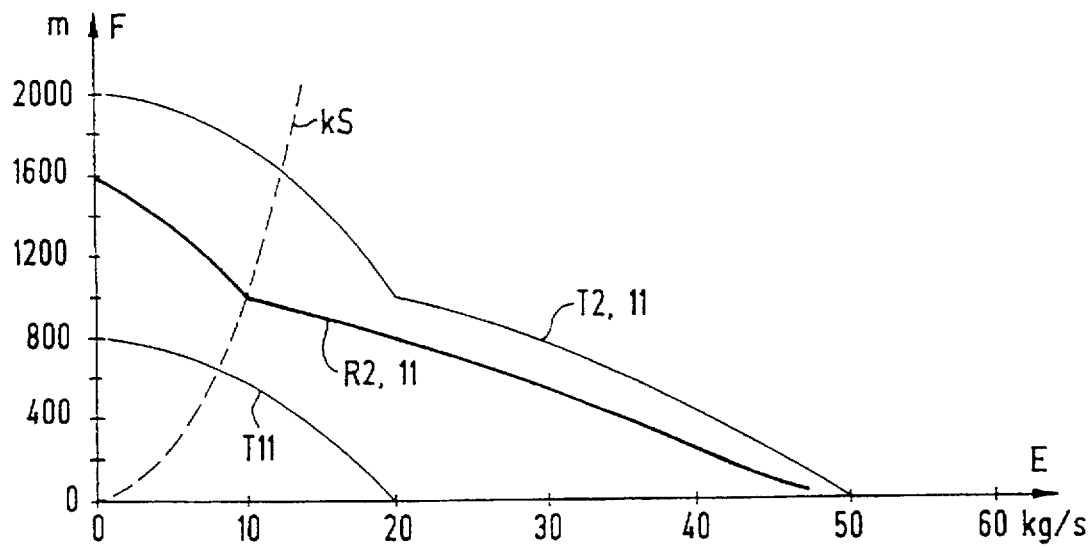

FIG. 4 shows the characteristic curves KS; T2.11; R2.11 for the situation in which the fill level is maintained at zero load hot and the volume control system is unavailable, yet the primary cooling system is intact; i.e., the throttle restriction 20 for the small minimum quantity in the branch line 20 m is open, and the safety feed pump 2 and additional borating pump 11 are in operation. Their feed levels are added together (operating situation c).

Figure 5:
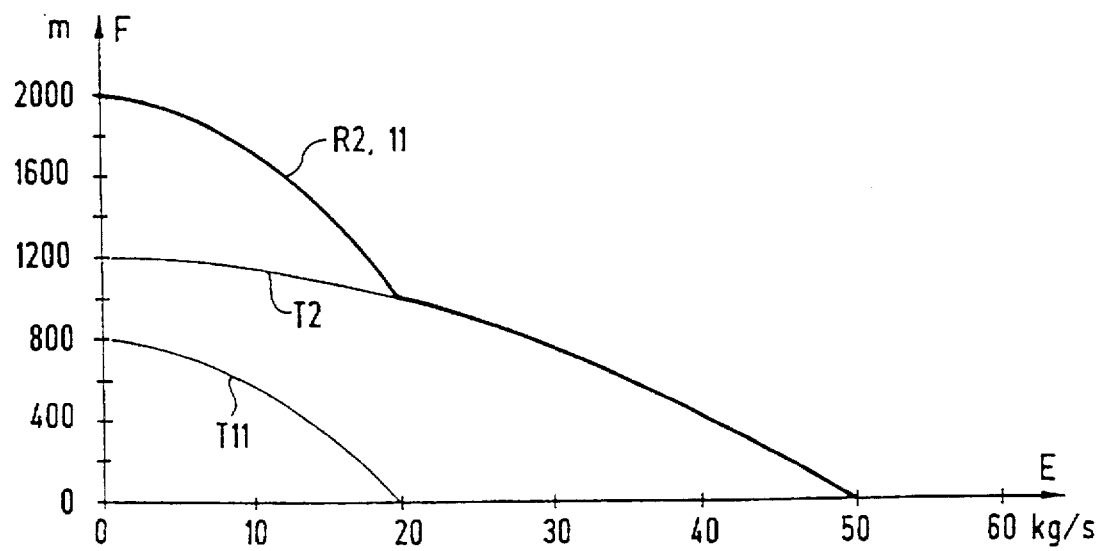

FIG. 5 shows the characteristic curves for the situation of borating of the primary system or spraying of coolant into the pressure vessel 15; i.e., the minimum quantity line 18 is closed by the valve 17, and the safety feed pump 2 and additional borating pump 11 are in operation. Their feed levels are added together (operating situation d). Depending on whether borating of the primary system occurs—in which case the motor valve 4 is opened—or spraying into the pressure vessel 15 is done, some other characteristic curve, not shown, for the system is the result.

For example, the safety feed pump 2 may have a zero feed level; that is, it may have its maximum feed level with a closed minimum quantity line 18, corresponding to approximately 120 bar, while its actual feed level in the readiness position, or in other words with the small minimum quantity line opened, is only 90 bar instead. The common feed level of the two pumps 2, 11 can be limited to 150 bar if the branch line 20 m is open, or in other words at a small minimum quantity.

From the above information with regard to FIGS. 2–5 it becomes clear that with the invention there is provided a process for operating a pressurized water reactor with a safety feed and borating system and with a reactor cooling system for the reactor pressure vessel for controlling the four operating situations shown in FIGS. 2–5; the operating situations are defined as follows:

a) steam generator heating tube leak and coolant loss incident;

b) small leak in primary system with inadequate secondary-side heat dissipation;

c) maintenance of fill level in reactor pressure vessel at zero load hot and unavailable volume control system but intact primary system; and d) borating of the primary system.

The process entails the following steps:

in situation (a): the branch line 21 m with the throttle restriction 20 for the large minimum quantity is opened and the safety feed pump 2 is put into operation;

in situation (b): the branch line 20 m with the throttle restriction 20 for the small minimum quantity is opened, and of the two pumps 2, 11 the safety feed pump 2 is put into operation;

in situation (c): the branch line 20 m having the throttle restriction 20 for the small minimum quantity is opened, and both the safety feed pump 2 and the additional borating pump 11 are put into operation; and in situation (d): the minimum quantity line 18 is blocked, and both the safety feed pump 2 and the additional borating pump 11 are put into operation.

The provisions explained above in conjunction with FIGS. 2-5 are used in order to control these operating situations.

I claim:

1. In combination with a pressurized water reactor, a safety feed and borating system for the pressurized water reactor, comprising:

a safety feed pump;

a parallel circuit connected in series with said safety feed pump, said parallel circuit being formed with a borating pump and a bypass line with a shutoff device connected in parallel with said borating pump;

a feed bank connected downstream of said safety feed pump and said parallel circuit; and a branch system communicating with said feed bank, said branch system including at least two branch lines selectively connectable to said feed bank, a first one of said branch lines having a first throttle restriction for a large quantity and a second one of said branch lines having a second throttle restriction for a small quantity.

2. The safety feed and borating system according to claim 1, wherein said branch system includes a line connected between said feed bank, and said at least two branch lines.

3. The safety feed and borating system according to claim 1, wherein said parallel circuit is connected downstream of said safety feed pump, as seen in a flow direction of said pumps.

4. The safety feed and borating system according to claim 1, wherein said shutoff device, when opened, functions as a check valve.

5. The safety feed and borating system according to claim 1, wherein said borating pump is a centrifugal pump.

6. A method of controlling abnormal operating conditions in a pressurized water reactor, which comprises:

in case of the following abnormal operating situations:
  a) leak in a heating tube of a steam generator and loss of coolant;
  b) small leak in primary system with inadequate secondary-side heat dissipation;
  c) maintenance of fill level in reactor pressure vessel at zero load hot and unavailable volume control system but intact primary system; and
  d) not enough boron in the primary system;

operating a safety feed and borating system for the pressurized water reactor, the system including: a safety feed pump; a parallel circuit connected in series with said safety feed pump, said parallel circuit being formed with a borating pump and a bypass line with a shutoff device connected in parallel with said borating pump; a feed bank connected downstream of said safety feed pump and said parallel circuit; and a branch system communicating with said feed bank, said branch system including at least two branch lines selectively connectable to said feed bank, a first one of said branch lines having a first throttle restriction for a large quantity and a second one of said branch lines having a second throttle restriction for a small quantity.

7. A method of operating a safety feed and borating system in a pressurized water reactor having a reactor cooling system with a primary system and a secondary system, the method which comprises:

providing a safety feed pump and connecting a parallel circuit in series with the safety feed pump, the parallel circuit comprising a borating pump and a bypass line with a cutoff device connected in parallel with the borating pump, connecting a feed bank downstream of safety feed pump and the parallel circuit, and branching a branch from the feed bank into a reactor containment, the branch including a branch line with a first throttle restriction for a large quantity and a branch line with a second throttle restriction for a small quantity;

and selectively performing the following steps in response to the following abnormal operating situations:
  a) if a leak in a heating tube of a steam generator and loss of coolant is determined, opening the branch line with the first throttle restriction and operating the safety feed pump;
  b) if a small leak in a primary system with inadequate secondary-side heat dissipation is determined, opening the branch line with the second throttle restriction and operating the safety feed pump;
  c) if a fill level is maintained in the reactor pressure vessel at zero load hot and a volume control system is unavailable but the primary system is intact, opening the branch line with the second throttle restriction and operating the safety feed pump and the borating pump; and
  d) if the primary system requires borating, blocking the branch system and operating both the safety feed pump and the borating pump.

* * * * *